United States Patent
Hornbach

(10) Patent No.: US 9,260,981 B2
(45) Date of Patent: Feb. 16, 2016

(54) BEARING HOUSING OF AN EXHAUST-GAS TURBOCHARGER

(75) Inventor: Johannes Hornbach, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 411 days.

(21) Appl. No.: 13/814,295

(22) PCT Filed: Aug. 4, 2011

(86) PCT No.: PCT/US2011/046536
§ 371 (c)(1),
(2), (4) Date: Feb. 5, 2013

(87) PCT Pub. No.: WO2012/024092
PCT Pub. Date: Feb. 23, 2012

(65) Prior Publication Data
US 2013/0149116 A1    Jun. 13, 2013

(30) Foreign Application Priority Data
Aug. 16, 2010  (DE) .......................... 10 2010 034 457

(51) Int. Cl.
| | |
|---|---|
| *F01D 25/24* | (2006.01) |
| *F01D 17/06* | (2006.01) |
| *F01D 25/16* | (2006.01) |
| *F16C 35/02* | (2006.01) |
| *F16C 17/18* | (2006.01) |

(52) U.S. Cl.
CPC ............... *F01D 25/24* (2013.01); *F01D 17/06* (2013.01); *F01D 25/16* (2013.01); *F16C 35/02* (2013.01); *F05D 2220/40* (2013.01); *F16C 17/18* (2013.01); *F16C 2360/24* (2013.01)

(58) Field of Classification Search
CPC ......... F01D 17/06; F01D 25/16; F01D 25/24; F05D 2220/40; F16C 17/18; F16C 35/02
See application file for complete search history.

(56) References Cited

U.S. PATENT DOCUMENTS

| | | | |
|---|---|---|---|
| 4,240,678 A | 12/1980 | Sarle et al. | |
| 4,256,441 A | 3/1981 | Arora | |
| 4,279,576 A | 7/1981 | Okano et al. | |
| 4,358,253 A * | 11/1982 | Okano et al. ................. | 417/407 |
| 4,722,630 A * | 2/1988 | Fang ............................. | 403/30 |
| 5,993,173 A | 11/1999 | Koike et al. | |
| 6,017,184 A * | 1/2000 | Aguilar et al. ................ | 415/112 |

* cited by examiner

*Primary Examiner* — Igor Kershteyn
(74) *Attorney, Agent, or Firm* — A. Michael Tucker; Stephan A. Pendorf; Patent Central LLC

(57) ABSTRACT

A bearing housing (1) of an exhaust-gas turbocharger (24), having a mounting bore (2), a bearing device (3) which has two bearing bushes (4, 5) arranged in the mounting bore (2), between which bearing bushes is arranged a spacer (6), and a rotational speed sensor (7) which is fixed in a bearing housing recess (9) and which engages into a sensor recess (8) of the spacer (6). A resilient sleeve (10) is arranged in the bearing housing recess (9) around the rotational speed sensor (7) and engages with one end (11) into the sensor recess (8).

5 Claims, 2 Drawing Sheets

BEARING HOUSING OF AN EXHAUST-GAS TURBOCHARGER

Figure 1:
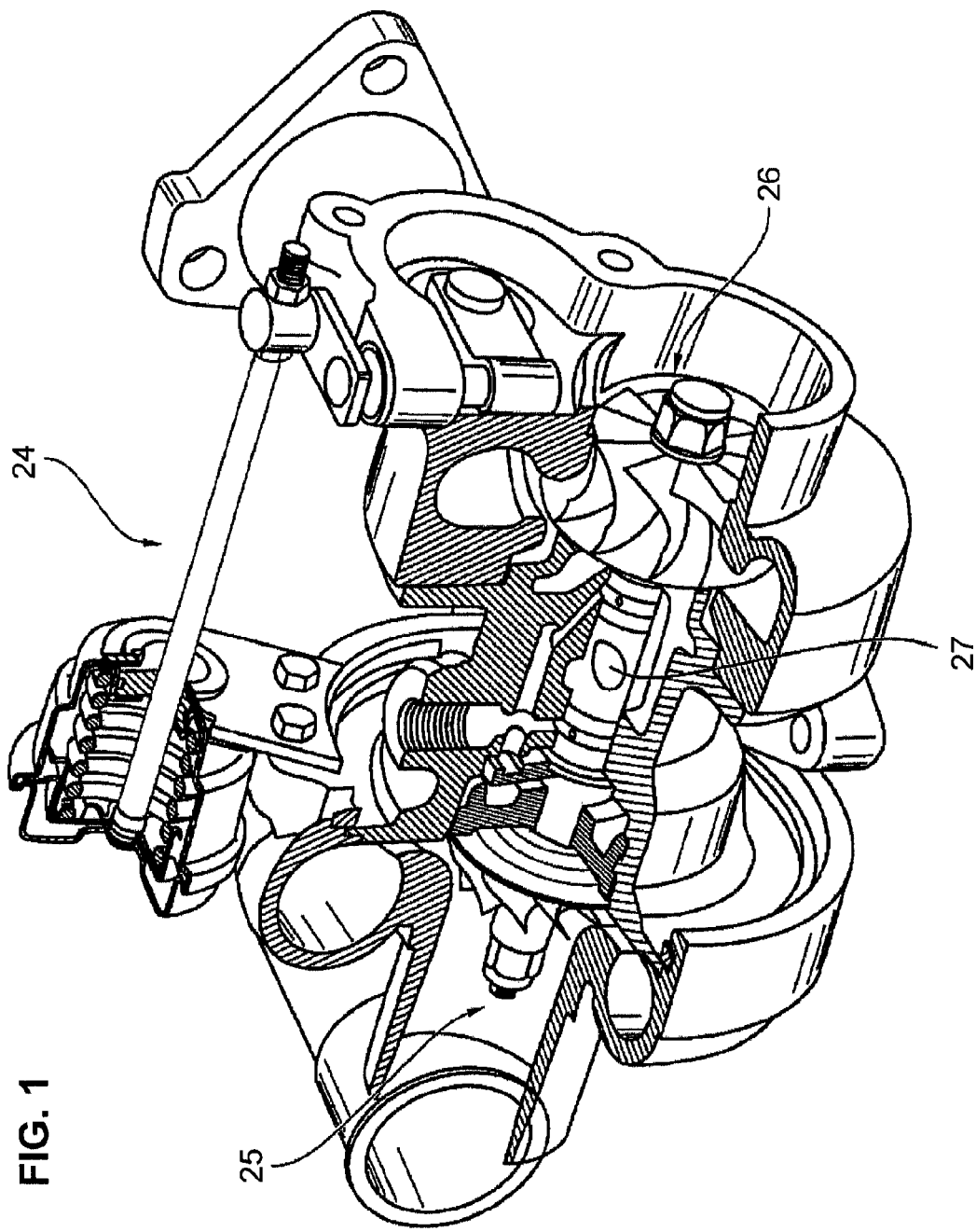

The invention relates to a turbocharger bearing housing.

A generic bearing housing has a mounting bore in which a bearing device is arranged for mounting the shaft of the exhaust-gas turbocharger. Said bearing device has two bearing bushes, the spacing of which to one another is determined by a spacer arranged between the bearing bushes. Furthermore, the bearing housing has a rotational speed sensor which is fixed in a bearing housing recess and which engages into a sensor recess of the spacer, since the rotational speed sensor must be directed directly toward the rotor shaft for signal measurement. If the rotational speed sensor must be exchanged during servicing, the spacer can turn and thereby hinder assembly of the rotational speed sensor or even damage the entire system.

It is therefore an object of the present invention to provide a bearing housing, which bearing housing can prevent the spacer from turning during an exchange of the rotational speed sensor.

Since a resilient sleeve which is arranged in the bearing housing recess of the rotational speed sensor can be fixed in the bearing housing and engages with one end into the sensor recess, for which purpose said resilient sleeve protrudes beyond the bearing housing recess. the spacer is capable of being secured in its position, such that the rotational speed sensor can be exchanged independently of the position of the spacer.

In a particularly preferred embodiment, that end of the sleeve which is situated opposite the end engaging into the sensor recess is provided with a fixing wedge which has a beveled chamfer on its two ends spaced apart in the axial direction, which chamfer engages into a correspondingly formed groove, which is provided with chamfers, of the bearing housing. In this way, using a corresponding tool, it is possible for the sleeve also to be non-destructively dismounted from the bearing housing if required.

Said dismounting capability is also facilitated by a further particularly preferred embodiment in which the sleeve or the sleeve body is provided with at least three segments, which may be formed for example by the provision of incisions in the sleeve body. In this case, the fixing wedge is divided into wedge segments, the number of which corresponds to the number of segments of the sleeve.

Figure 2:
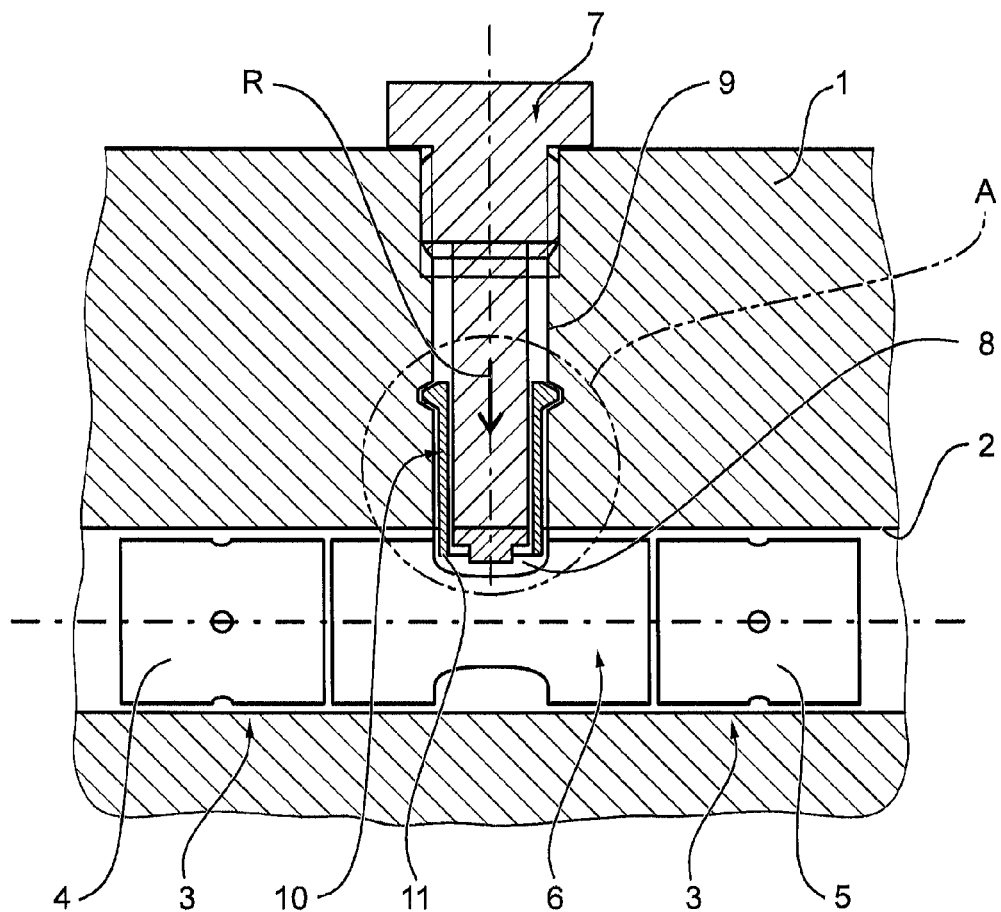
Figure 3:
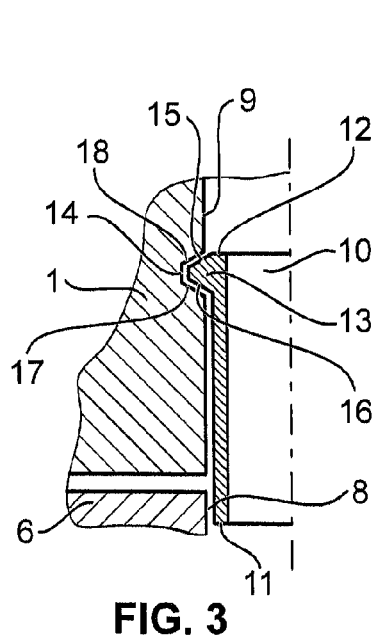
Figure 4:
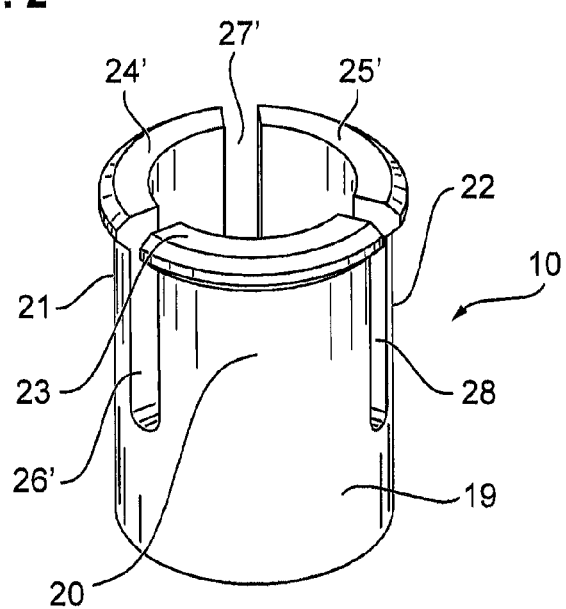

Further details, advantages and features of the present invention will emerge from the following description of an exemplary embodiment on the basis of the drawing, in which:

FIG. 1 shows a perspective illustration, partially in section, of an embodiment of an exhaust-gas turbocharger which can be provided with a bearing housing according to the invention, FIG. 2 shows a schematically simplified sectional illustration of part of the bearing housing according to the invention, FIG. 3 shows the detail A of FIG. 2 in an enlarged illustration, and FIG. 4 shows a schematically slightly simplified perspective illustration of a sleeve of the bearing housing according to the invention.

FIG. 1 illustrates an exhaust-gas turbocharger 24 according to the invention, which has a turbine 26 and a compressor 25 which are connected to one another via a bearing housing 1 in which is mounted a shaft 27. The exhaust-gas turbocharger 24 self-evidently also has all the other conventional components, but these will not be described in detail as they are not required for explaining the principles of the present invention.

FIG. 2 illustrates a part of the inventive bearing housing 1 of the turbocharger 24. The bearing housing 1 has a mounting bore 2 in which is arranged a bearing device 3 for the shaft 27. The bearing device 3 has two bearing bushes 4 and 5 which are arranged in the mounting bore 2 and between which is arranged a spacer 6.

The bearing housing 1 according to FIG. 2 also has a rotational speed sensor 7. The rotational speed sensor 7 is fixed, for example screwed, in a bearing housing recess 9. Furthermore, the rotational speed sensor 7 engages into a sensor recess 8 of the spacer 6 in order that it can be arranged as close as possible to the shaft 27 for reliable signal pick-up.

FIG. 2 also shows the protrusion of a resilient sleeve 10 which is arranged in the bearing housing recess 9 around the rotational speed sensor 7. The lower end 11 of the sleeve 10 in the selected illustration protrudes beyond the bearing housing recess 7 in the radial direction R and thereby engages into the sensor recess 8 in order to be able to ensure an undesired turning of the spacer 6 independently of the rotational speed sensor 7.

The detail A is illustrated in FIG. 3 in an enlarged illustration in order to more clearly show the fixing of the sleeve 10 in the bearing housing 1. The sleeve 10 has a fixing wedge 13 at its end 12 arranged opposite the end 11 which engages into the sensor recess 8. FIG. 3 illustrates the assembled state of the sleeve 10, in which said fixing wedge 13 engages or is latched into a fixing groove 14 of the bearing housing 1.

In the particularly preferred embodiment illustrated in FIG. 3, the fixing wedge 13 has beveled wedge chamfers 15 and 16 at both sides, resulting in a design similar to a truncated cone. As shown in FIG. 3, the fixing groove 14 has beveled groove chamfers 17 and 18 corresponding to the design of the wedge chamfers 15 and 16, such that on account of the resilient properties of the sleeve 10, the fixing wedge 13 can latch elastically into the fixing groove 14 as said sleeve is inserted into the bearing housing recess 9. If it is necessary for the sleeve 10 to be dismounted, it is possible for the sleeve 10 to be pulled upward out of the bearing housing recess 9 using a suitable tool, because, when the chamfers 15 and 18 which are in this case situated opposite one another run against one another, the fixing wedge 13 springs back and can therefore be placed out of engagement with the fixing groove 14.

FIG. 4 shows a schematically slightly simplified perspective illustration of the sleeve 10, which shows a further particularly preferred embodiment. The sleeve 10 has a sleeve body 19 which, in the example, is provided with three segments 20, 21 and 22. The fixing wedge 13 is in this case divided into three wedge segments 23, 24' and 25' which are assigned to the segments 20, 21 and 22, as can be seen in FIG. 4.

In the embodiment illustrated in FIG. 4, the segments 20 to 22 are formed by incisions 26', 27' and 28 in the sleeve body (19), as can be seen in detail from FIG. 4.

In addition to the above written disclosure of the invention, reference is hereby explicitly made to the diagrammatic illustration thereof in FIGS. 1 and 2.

LIST OF REFERENCE SYMBOLS

1 Bearing housing
2 Mounting bore
3 Bearing device
4, 5 Bearing bushes
6 Spacer
7 Rotational speed sensor
8 Sensor recess
9 Bearing housing recess 10 Sleeve
11 End of the sleeve
12 Other end of the sleeve
13 Fixing wedge
14 Fixing groove
15, 16 Wedge chamfers
17, 18 Groove chamfers
19 Sleeve body
20, 21, 22 Segments of the sleeve body
23, 24', 25' Wedge segments
26', 27', 28 Incisions
24 Exhaust-gas turbocharger
25 Compressor
26 Turbine
27 Shaft
R Radial direction

The invention claimed is:

1. A bearing housing (1) of an exhaust-gas turbocharger (24), having
    a mounting bore (2),
    a bearing device (3) which has two bearing bushes (4, 5) arranged in the mounting bore (2), between which bearing bushes is arranged a spacer (6), and
    a rotational speed sensor (7) which is fixed in a bearing housing recess (9) and which engages into a sensor recess (8) of the spacer (6),
    wherein a resilient sleeve (10) is arranged in the bearing housing recess (9) around the rotational speed sensor (7) and engaging with one end (11) into the sensor recess (8), the sleeve (10) provided at its other end (12) with a fixing wedge (13) which, in the assembled state, engages into a fixing groove (14) of the bearing housing (1).

2. The bearing housing (1) as claimed in claim 1, wherein the fixing wedge (13) is provided at both sides with beveled wedge chamfers (15, 16) and the fixing groove (14) is provided with complementarily beveled groove chamfers (17, 18).

3. A bearing housing (1) of an exhaust-gas turbocharger (24), having
    a mounting bore (2),
    a bearing device (3) which has two bearing bushes (4, 5) arranged in the mounting bore (2), between which bearing bushes is arranged a spacer (6), and
    a rotational speed sensor (7) which is fixed in a bearing housing recess (9) and which engages into a sensor recess (8) of the spacer (6),
    wherein a resilient sleeve (10) is arranged in the bearing housing recess (9) around the rotational speed sensor (7) and engaging with one end (11) into the sensor recess (8), wherein the sleeve (10) has a sleeve body (19) which is provided with at least three segments (20, 21, 22).

4. The bearing housing (1) as claimed in claim 3, wherein the fixing wedge (13) is divided into a number of wedge segments (23, 24' and 25') corresponding to the number of segments (20, 21, 22).

5. The bearing housing as claimed in claim 3, wherein the segments (20, 21, 22) are formed by incisions (26', 27' and 28) into the sleeve body (19).

* * * * *